United States Patent
Markowitz et al.

(10) Patent No.: US 9,145,040 B2
(45) Date of Patent: Sep. 29, 2015

(54) HEAT EXCHANGER FOR AN AIR CONDITIONING SYSTEM

(71) Applicants: Markus Markowitz, Cologne (DE); Dietmar Fischer, Köln (DE)

(72) Inventors: Markus Markowitz, Cologne (DE); Dietmar Fischer, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 324 days.

(21) Appl. No.: 13/765,693

(22) Filed: Feb. 13, 2013

(65) Prior Publication Data
US 2013/0283841 A1 Oct. 31, 2013

(30) Foreign Application Priority Data
Feb. 23, 2012 (DE) .......................... 10-2012-202752

(51) Int. Cl.
| | | |
|---|---|---|
| *F25D 19/00* | (2006.01) | |
| *B60H 1/00* | (2006.01) | |
| *F28D 7/10* | (2006.01) | |
| *G10K 11/16* | (2006.01) | |
| *F25B 40/00* | (2006.01) | |
| *F28F 13/08* | (2006.01) | |
| *F28F 13/10* | (2006.01) | |

(52) U.S. Cl.
CPC ........ *B60H 1/00321* (2013.01); *B60H 1/00342* (2013.01); *F25B 40/00* (2013.01); *F28D 7/106* (2013.01); *G10K 11/161* (2013.01); *B60H 2001/006* (2013.01); *F25B 2500/12* (2013.01); *F28F 13/08* (2013.01); *F28F 13/10* (2013.01); *F28F 2250/00* (2013.01); *F28F 2265/28* (2013.01)

(58) Field of Classification Search
CPC ....... F25B 2500/12; F24F 13/24; F28F 13/10; B60H 1/00371
USPC ................... 62/296, 239, 238.7, 244; 165/84
See application file for complete search history.

(56) References Cited

U.S. PATENT DOCUMENTS

| | | | | |
|---|---|---|---|---|
| 3,220,639 | A * | 11/1965 | Chew ............................ | 417/243 |
| 3,785,453 | A * | 1/1974 | Buonocore et al. ........... | 181/211 |
| 8,142,172 | B2 | 3/2012 | Foerster | |
| 8,499,727 | B1 * | 8/2013 | Pett, Jr. ........................ | 123/53.6 |
| 2003/0042721 | A1 | 3/2003 | Bocksch et al. | |
| 2006/0239836 | A1 | 10/2006 | Foerster | |
| 2007/0012070 | A1 | 1/2007 | Vetter | |
| 2013/0145792 | A1* | 6/2013 | Toyama et al. ................. | 62/498 |

FOREIGN PATENT DOCUMENTS

| | | |
|---|---|---|
| DE | 273470 A1 | 11/1989 |
| DE | 29817924 U1 | 1/1999 |
| DE | 10142168 A1 | 4/2003 |

(Continued)

OTHER PUBLICATIONS

German Patent and Trademark Office, Examination Report for the corresponding German Patent Application No. 10 2013 201 313.2 mailed Nov. 12, 2013.

*Primary Examiner* — Melvin Jones

(74) *Attorney, Agent, or Firm* — Vichit Chea; Brooks Kushman P.C.

(57) ABSTRACT

An internal heat exchanger for an air conditioning system, having: a high pressure side through which a coolant under high pressure flows in operation; and a low pressure side through which coolant under low pressure flows in operation. The heat exchanger is configured in such a way that pulsations of the coolant flowing therethrough dampen noise.

17 Claims, 3 Drawing Sheets

(56) References Cited

FOREIGN PATENT DOCUMENTS

| DE | 102005033019 A1 | 7/2005 |
|---|---|---|
| DE | 102005033019 A1 | 1/2007 |
| EP | 1553284 A1 | 7/2005 |
| EP | 1715189 A1 | 10/2006 |

* cited by examiner

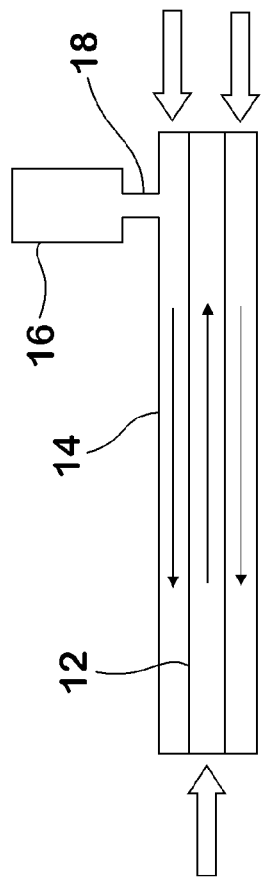
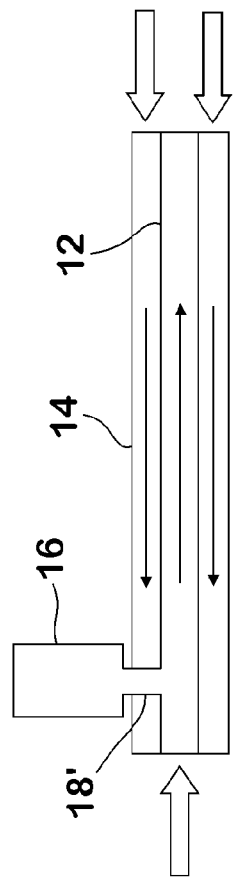
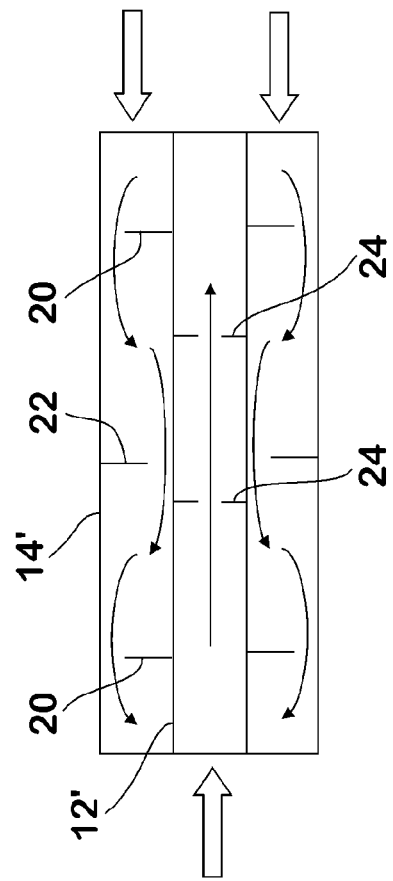

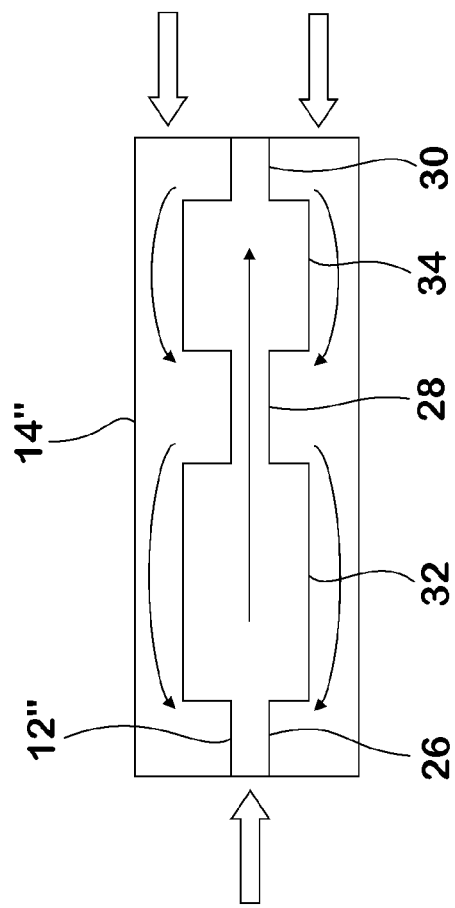
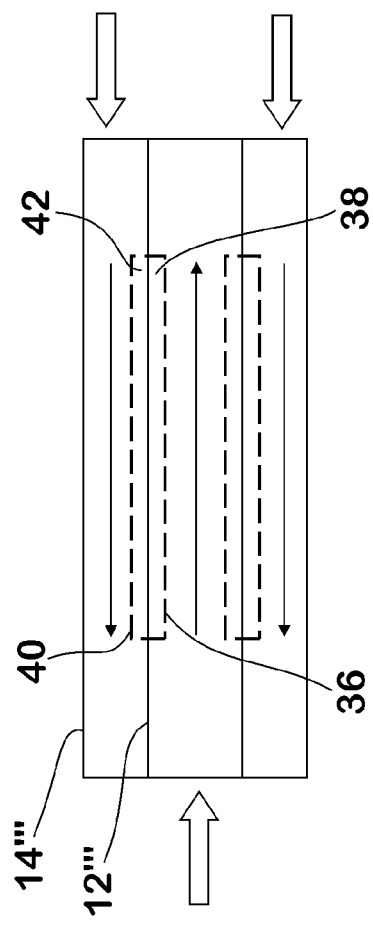
Fig. 5
Fig. 6

HEAT EXCHANGER FOR AN AIR CONDITIONING SYSTEM

CROSS-REFERENCE TO RELATED APPLICATIONS

This application claims priority to German Patent Application No. De 102012202752.1 titled "Heat Exchanger for an Air Conditioning System," filed Feb. 23, 2012, which is hereby incorporated in its entirety.

TECHNICAL FIELD

The present disclosure relates to an internal heat exchanger for an air conditioning system, in particular for use in a motor vehicle.

BACKGROUND

Modern vehicles include a vehicle heating, ventilation and air conditioning system to control air cabin temperature and cool the powertrain. Standard HVACs include some sort of a heat exchanger. The use of the heat exchanger with a compressor motor and other HVAC components can take up packaging space and be louder than desired.

Therefore it is desirable to have an air conditioning system configured for use in motor vehicles that is less complicated, smaller, relatively more economical and quieter than contemporary designs.

SUMMARY

The present disclosure addresses one or more of the above-mentioned issues. Other features and/or advantages will become apparent from the description which follows.

One advantage of the present disclosure is that it provides an air conditioning system that can be used in motor vehicles, which is less complicated, more space-saving and economical and quieter in operation than modern designs.

Some exemplary embodiments include a resonant chamber having a porous, sound absorbing material that contributes to a quieter performance of the heat exchanger.

One exemplary embodiment of the present disclosure relates to an internal heat exchanger for an air conditioning system, having: a high pressure side through which a coolant under high pressure flows in operation; and a low pressure side through which coolant under low pressure flows in operation. The heat exchanger is configured in such a way that pulsations of the coolant flowing therethrough dampen noise.

One exemplary embodiment of the present disclosure relates to an air conditioning system for a motor vehicle, having: a compressor; and an internal heat exchanger in fluid communication with the compressor. The heat exchanger includes a high pressure side and a low pressure side. The heat exchanger is configured in such a way that pulsations of the coolant flowing therethrough dampen noise.

Another exemplary embodiment of the present disclosure relates to a vehicle heating ventilation and air conditioning (HVAC) heat exchanger, including: a high pressure side through which coolant can flow; a low pressure side through which coolant can flow at a lower pressure than the high pressure side; and a damper in the high or low pressure side configured to dampen noise as coolant flows therethough.

The invention will be explained in greater detail below by way of example with reference to the figures, in which the same reference numbers are used in the figures for identical or essentially identical elements. The above features and advantages and other features and advantages of the present invention are readily apparent from the following detailed description for carrying out the invention when taken in connection with the accompanying drawings. In the figures:

BRIEF DESCRIPTION OF THE DRAWINGS

FIGS. 2 through 6 are schematic depiction of various exemplary heat exchangers accordingly to several embodiments of the present disclosure.

DETAILED DESCRIPTION

Figure 1:
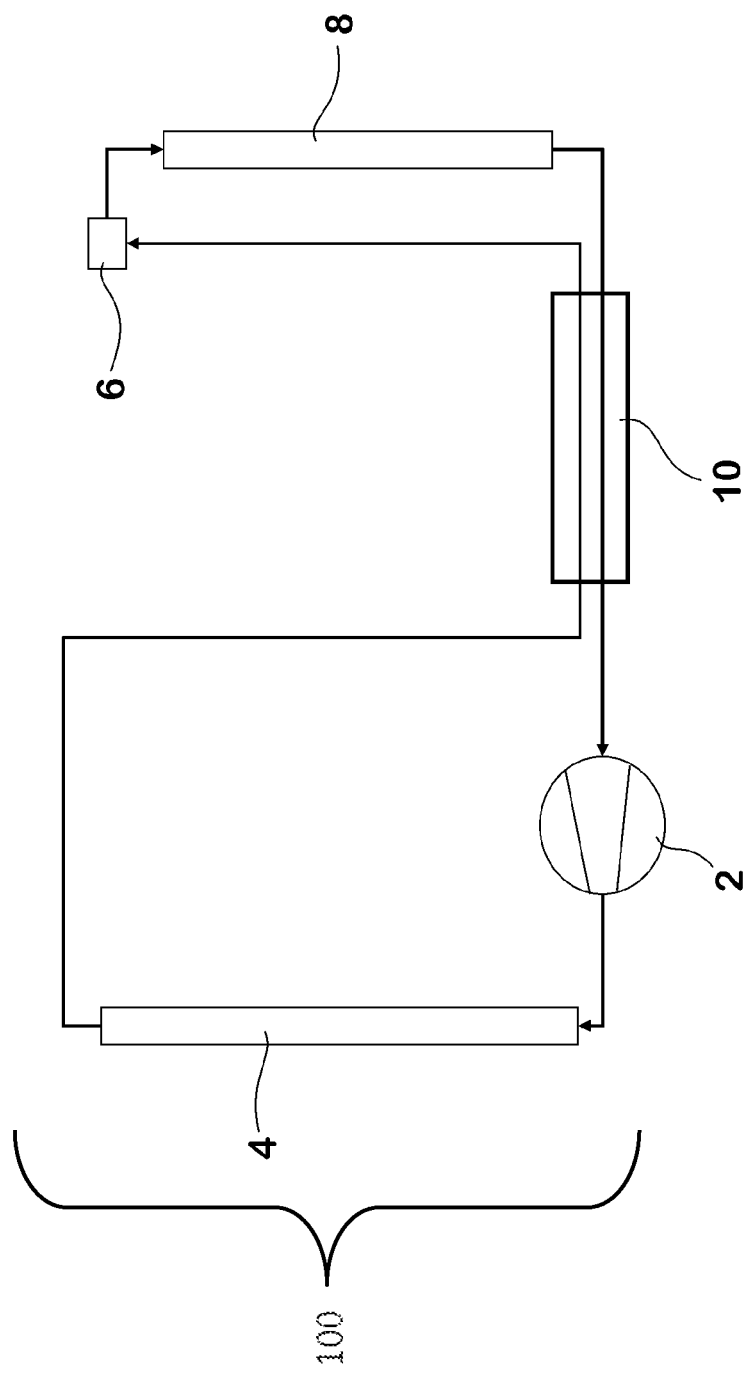
FIG. 1 is a schematic depiction of an exemplary motor vehicle air conditioning system.

Referring to the drawing, wherein like characters represent examples of the same or corresponding parts throughout the several views, there are shown heat exchangers for a motor vehicle air conditioning system or HVAC. The heat exchangers are configured with dampers or isolators that reduce, cancel or absorb noise during operation.

The illustrated heat exchangers are designed on a high pressure side or low pressure side such that pulsations of the coolant flowing therethrough dampen a predetermined frequency or a few predetermined frequencies within the air conditioning system. The noise damping structures are formed in or on the heat exchanger. No separate noise insulation components are included in the motor vehicle.

Referring now to FIG. 1 a motor vehicle-air conditioning system 100 is shown. The system contains a pulsating compressor 2, a condenser 4, an expansion element 6 (e.g., a valve or similar device), an evaporator 8 and an internal heat exchanger 10. As shown in FIG. 1 by the directional lines, a compressed coolant flows on a high pressure side (or top portion of heat exchanger 10) from an output of the compressor 2 via a condenser 4. Coolant then flows from the heat exchanger 10 to the input of the expansion element 6, and to a low pressure side (or bottom of the heat exchanger 10) by the expansion element 6 and evaporator 8. Coolant then returns to the compressor 4.

FIGS. 2 to 6 show schematic cross-sectional views of exemplary embodiments of an internal heat exchanger compatible with the air conditioning system 100 of FIG. 1. The shown heat exchangers are coaxial pipe heat exchangers. As shown, heat exchangers include an inner pipe 12 (12', 12" or 12'''), through which compressed coolant flows in a longitudinal direction. Heat exchangers also includes an outer pipe 14 (14', 14" or 14''') coaxially enclosing the inner pipe, through which the unpressurised coolant is flowing in the opposite direction. The directions in which the compressed and the unpressurised coolant enter the heat exchanger 10 are each indicated with contoured arrows, and coolant flowing within the pipes 12, 14 is indicated with straight arrows. Identical or similar components in FIGS. 2 to 6 are designated with identical or mutually corresponding reference numbers.

In the example of FIG. 2, a Helmholtz resonator 16 has a flow connection via a short connecting pipe 18 to an interior of the outer pipe 14 and to the exterior of the inner pipe 12. Helmholtz resonator 16 consists of a volume with a narrow opening and forms a mechanical mass-spring system with pronounced natural resonance that can be calculated from the geometry of the Helmholtz resonator. A spherical Helmholtz resonator has one resonant frequency. Other resonators, e.g. bottle-shaped, cylindrical or cube-shaped Helmholtz resonators can be used. Resonator 16 is configured to dampen noise.

In the example of FIG. 3, a Helmholtz resonator 16 has a flow connection via a short connecting pipe 18' to the interior of the inner pipe 12.

The Helmholtz resonator 16 of FIGS. 2 and 3 and the connecting pipe 18 or 18' are dimensioned so that a natural frequency or the natural frequencies of the resonator and the connecting pipe 18 or 18' correspond to a pulsation frequency or a plurality of pulsation frequencies of a, e.g., compressor 2 as shown in FIG. 1. Thus, resonator 16 causes effective damping of the noise of the air conditioning system caused by the pulsating coolant.

In other embodiments, a plurality of Helmholtz resonators is provided on each of the high pressure side or the low pressure side of the heat exchanger. The exemplary embodiments of FIGS. 2 and 3 can be combined in that both the high pressure side and the low pressure side of the heat exchanger are each provided with one or a plurality of Helmholtz resonators.

Now turning to the exemplary embodiment of FIG. 4, a heat exchanger includes an inner pipe 12' and an outer pipe 14', each having a larger diameter than the inner pipe 12 and the outer pipe 14 of FIGS. 2 and 3. In an interior of outer pipe 14' and outside and around the inner pipe 12', a plurality of annular vanes 20, 22 are fixed at defined distances apart, as shown in FIG. 4. The interior of the inner pipe 12 includes a plurality of annular restrictor plates 24 fixed at defined distances apart.

The vanes 20, 22 and the restrictor plates 24 are dimensioned and arranged in such a way that the changes in flow cross-section (or cross-sectional area) caused by the position of vanes changes flow speed and flow direction of the coolant flowing therethrough. The change in flow leads to pulsations of the coolant at a pulsation frequency or pulsation frequencies. Noise from a compressor, e.g., 2 of FIG. 1, is effectively damped.

Structures can also be formed by fixed walls built into the heat exchanger, which change, locally or in sections, the flow cross-section for the coolant on the high pressure side and/or low pressure side, e.g. resonance walls or sound walls in the form of deflector plates, baffle plates, vanes, baffles and the line. Walls can also consist of other materials than sheet metal.

Structures can also be formed at least partly of porous partitions, which separate the high pressure side and/or the low pressure side of the heat exchanger over a relatively large area from at least one resonant chamber. This resonant chamber can also contain a porous sound insulation material. Structures resonant frequency or frequencies can be tuned to pulsations of the coolant flowing through.

In the exemplary embodiment of FIG. 5, a heat exchanger comprises an inner pipe 12' and an outer pipe 14'', whose flow cross-sections change along a length. An inner pipe 12'' has meandering contours when viewed in a longitudinal section, i.e. alternate successive sections 26, 28 and 30 have smaller diameters than sections 32, 34. Flow cross-sectional changes change the flow speed and flow direction of the coolant flowing therethrough. Pulsations of the coolant are tuned to a pulsation frequency or pulsation frequencies to dampen or cancel noise from compressor 2 of FIG. 1.

In the example of FIG. 6, the heat exchanger comprises an inner pipe 12''' and an outer pipe 14'''. Each pipe 12''' and 14''' has a larger diameter than the inner pipe 12 and the outer pipe 14 of FIGS. 2 and 3. Within the inner pipe 12''', at a small distance therefrom, a porous partition 36 extends that separates the high pressure side over a relatively large area, i.e. over a significant part of their lengths, from a resonant chamber 38 formed between the inner pipe 12''' and the partition 36 that is tuned to the pulsations of the coolant flowing through the inner pipe 12''. Outside the inner pipe 12''' at a small distance therefrom, another porous partition 40 extends that separates the low pressure side over a relatively large area from a resonant chamber 42 formed between the inner pipe 12''' and the partition 40, which is tuned to the pulsations of the coolant flowing through the outer pipe 14''. The resonant chambers 38, 42 can each be filled with a porous sound absorption material. The dimensions of the resonant chambers 38, 42 and their filling material are designed so that pulsations of the coolant at the pulsation frequency or the pulsation frequencies of the compressor 2 of FIG. 1 can effectively be damped.

For all embodiments shown, the flow of coolant through the heat exchanger can also be reversed by a compressed coolant flowing through the outer pipe and the unpressurised coolant flowing through the inner pipe.

A person of ordinary skill in the art will recognize that the exemplary embodiments of FIGS. 4 to 6 can also be combined with the examples of FIGS. 2 and 3.

Since the disclosed sound-absorbing structures can be formed during manufacture of the heat exchanger, such structures can be produced particularly economically and save space.

These techniques damp one or more predetermined frequencies in the compressors commonly used in motor vehicle air conditioning systems, at which the compressor predominantly stimulates coolant to form pulsations, referred to below as a pulsation frequency of the compressor.

In one embodiment, the heat exchanger is provided on its high pressure side and/or its low pressure side with structures that change the flow characteristics of the coolant flowing through, in particular the flow speed and/or the flow direction, in such a way that pulsations of the coolant flowing through are damped at the one predetermined frequency or the few predetermined frequencies.

Those familiar with the art to which this invention relates will recognize various alternative designs and embodiments for practicing the invention within the scope of the appended claims.

We claim:

1. An internal heat exchanger for an air conditioning system, comprising:
   a high pressure side through which a coolant under high pressure flows in operation; and
   a low pressure side through which coolant under low pressure flows in operation, wherein the heat exchanger is configured to damp noise at a plurality of predetermined frequencies caused by pulsations of the coolant flowing through the heat exchanger.

2. The internal heat exchanger of claim 1, further comprising: a resonator connected to the high or low pressure side and configured to have a natural frequency corresponding to at least one of the predetermined frequencies.

3. The internal heat exchanger of claim 1, further comprising: structures on the high or low pressure side configured to change coolant flow speed or direction thereby damping noise to a predetermined frequency.

4. The internal heat exchanger of claim 3, wherein the structures are fixed walls installed in the heat exchanger configured to change a coolant flow cross-section on the high pressure or low pressure side of the heat exchanger.

5. The internal heat exchanger of claim 3, wherein the structures are at least partly formed as air-permeable partitions.

6. The internal heat exchanger of claim 5, further comprising: a resonant chamber in the high or low pressure side tuned to a pulsation frequency of coolant flowing therethrough.

7. The internal heat exchanger of claim 6, wherein the resonant chamber includes a porous, sound absorbing material.

8. The internal heat exchanger of claim 1, wherein the heat exchanger is a coaxial pipe heat exchanger.

9. An air conditioning system for a motor vehicle, comprising:
 a compressor; and
 an internal heat exchanger in fluid communication with the compressor, wherein the heat exchanger includes a high pressure side and a low pressure side, the heat exchanger is configured to generate a pulsation frequency equal to a pulsation frequency of the compressor in such a way that pulsations of the coolant flowing therethrough dampen noise.

10. An air conditioning system for a motor vehicle, comprising:
 a compressor;
 an internal heat exchanger in fluid communication with the compressor, wherein the heat exchanger includes a high pressure side and a low pressure side; and
 a resonator connected to the high or low pressure side, wherein the heat exchanger is configured in such a way that pulsations of the coolant flowing therethrough dampen noise.

11. The air conditioning system of claim 10, further comprising: structures on the high or low pressure side configured to change coolant flow speed or direction thereby damping coolant at one predetermined frequency.

12. A vehicle heating ventilation and air conditioning (HVAC) heat exchanger, comprising:
 a high pressure side through which coolant can flow;
 a low pressure side through which coolant can flow at a lower pressure than the high pressure side; and
 a damper in the high or low pressure side configured to dampen noise at different frequencies as coolant flows therethrough.

13. The vehicle HVAC heat exchanger of claim 12, wherein the damper is a resonator.

14. The vehicle HVAC heat exchanger of claim 12, wherein the damper is a structure configure to baffle a portion of the coolant flowing through the heat exchanger.

15. The vehicle HVAC heat exchanger of claim 14, wherein the structure includes a fixed wall positioned to change a flow cross-sectional area for the coolant in the high or low pressure side of the heat exchanger.

16. The vehicle HVAC heat exchanger of claim 14, wherein the structure is air permeable; and wherein the structure is configured to define a resonant chamber.

17. The vehicle HVAC heat exchanger of claim 16, wherein the resonant chamber includes a porous, sound absorbing material.

\* \* \* \* \*